A. A. WEST.
MECHANICAL MOVEMENT FOR COMBINED CLUTCH AND TRANSMISSION.
APPLICATION FILED JUNE 18, 1920.

1,362,655.

Patented Dec. 21, 1920.
4 SHEETS—SHEET 1.

Inventor
Augustus Albert West
By W. H. Williamson
Atty.

A. A. WEST.
MECHANICAL MOVEMENT FOR COMBINED CLUTCH AND TRANSMISSION.
APPLICATION FILED JUNE 18, 1920.
1,362,655.
Patented Dec. 21, 1920.
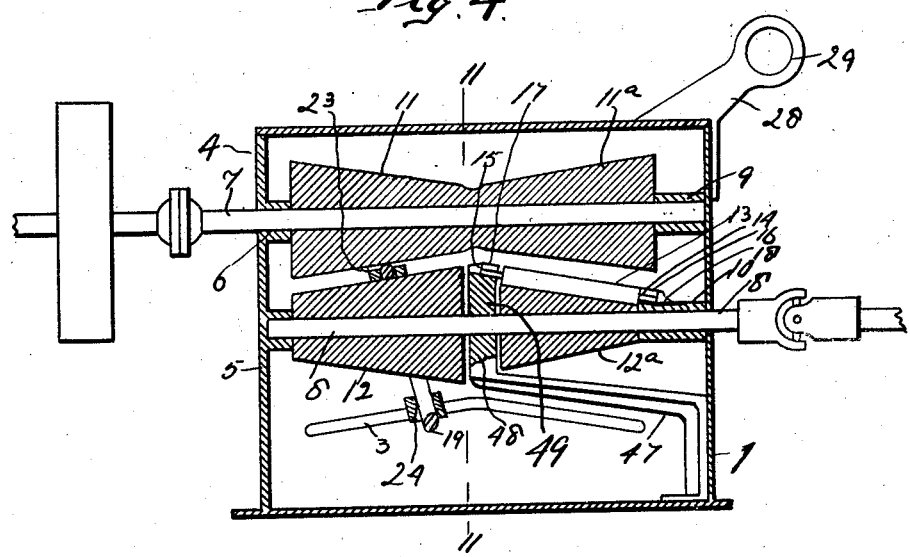
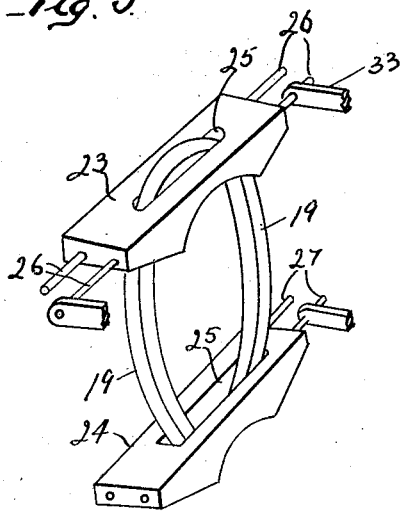
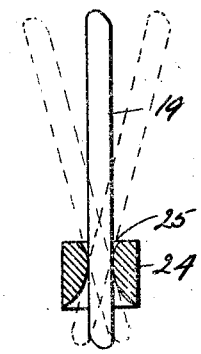
Inventor
Augustus Albert West
By W. H. Williamson Atty.

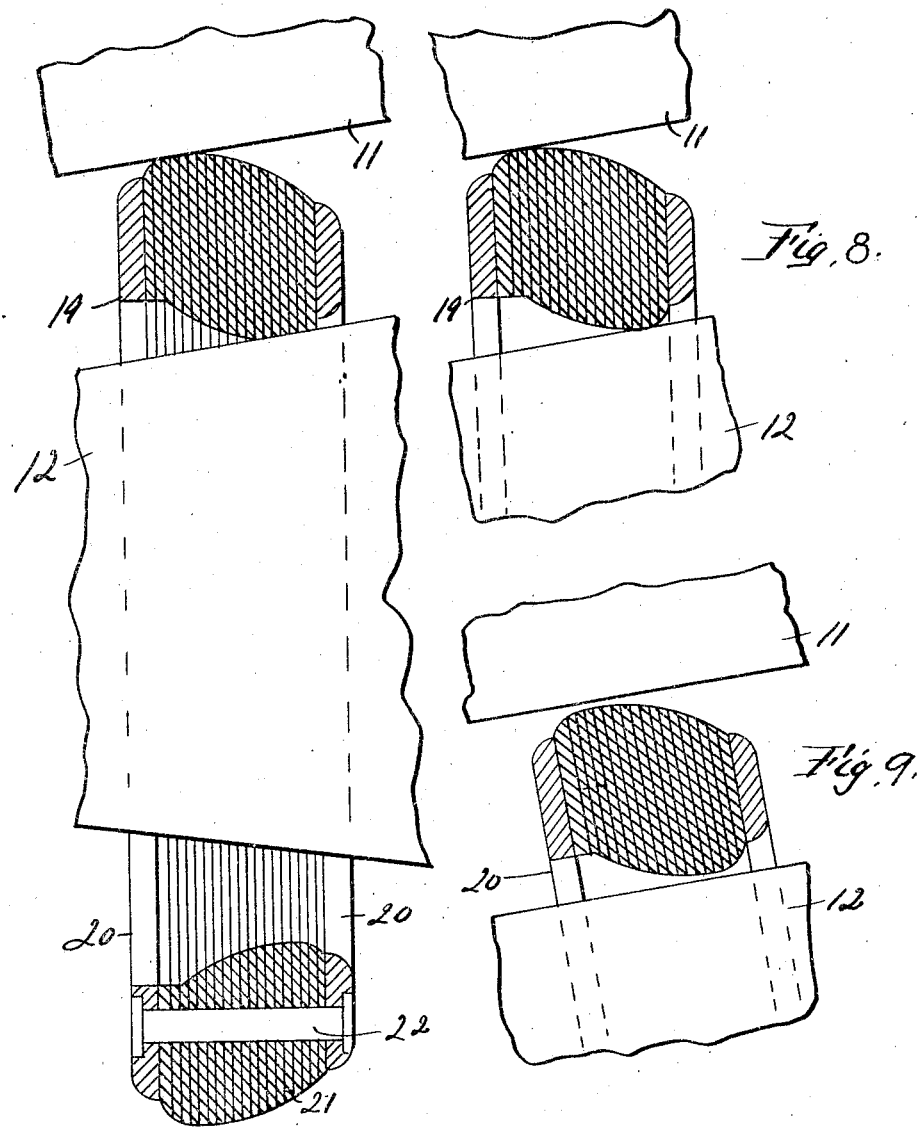

A. A. WEST.
MECHANICAL MOVEMENT FOR COMBINED CLUTCH AND TRANSMISSION.
APPLICATION FILED JUNE 18, 1920.

1,362,655.

Patented Dec. 21, 1920.

Inventor
Augustus Albert West
By W. R. Williamson
Atty.

UNITED STATES PATENT OFFICE.

AUGUSTUS ALBERT WEST, OF PHILADELPHIA, PENNSYLVANIA.

MECHANICAL MOVEMENT FOR COMBINED CLUTCH AND TRANSMISSION.

1,362,655.	Specification of Letters Patent.	Patented Dec. 21, 1920.

Application filed June 18, 1920. Serial No. 389,851.

*To all whom it may concern:*

Be it known that I, AUGUSTUS ALBERT WEST, a citizen of the United States, residing at Philadelphia, in the county of Philadelphia and State of Pennsylvania, have invented new and useful Improvements in Mechanical Movement for Combined Clutch and Transmission, of which the following is a specification.

My invention relates to a new and useful improvement in mechanical movement for combined clutch and transmission, and has for its object to provide an exceedingly simple and effective mechanism for transmitting power from a primary shaft to a secondary shaft and causing said secondary shaft to revolve in either direction, while the primary shaft is revolving in a single direction and varying the speed between the primary and secondary shafts at will whether the secondary shaft is being revolved in one or the other direction, and providing for the clutching and unclutching of the two shafts so as to permit the primary shaft to continue to revolve while stopping or starting the secondary shaft.

A further object of my invention is a cone friction drive having for its principal improvement a round ring member, the cross section of the solid portion of said ring being out of round which shape permits said ring to take up its own wear and to be thrown in and out of action between the cones at any point and providing for its ready removal or replacement or substitution. While I do not wish to limit this improved ring to any particular material or construction, in my experiments I have found that the best results are obtained where the ring is built up of two metal face rings after the manner of washers between which is bolted fiber of alternate strips of aluminum and straw board fiber, thus giving a higher coefficient of friction between the driving and driven surface.

In the drawings I have shown my invention adapted for use in automobiles, but it may be used for various other machinery.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 4, is a central section with the center brace for the lower cone broken away.

Fig. 5, is a perspective view of my improved ring and the members for moving it to and retaining it in various positions between the driving and driven surfaces.

Fig. 6, is an end section of the lower ring and retaining member showing the various positions of the ring in full dotted lines.

Fig. 7, is an enlarged view of my improved ring in position it assumes between the driving and driven cones for transmitting motion from the former to the latter under normal conditions.

Fig. 8, is a similar view of Fig. 7 partly broken away showing the position my improved ring assumes when jammed by the lever mechanism for increasing the grip between the driving and driven cone.

Fig. 9, is a view similar to Fig. 8 showing my improved ring in the position which it assumes when drawn out of contact with the driving and driven cones for unclutching the driving mechanism.

Figure 1:
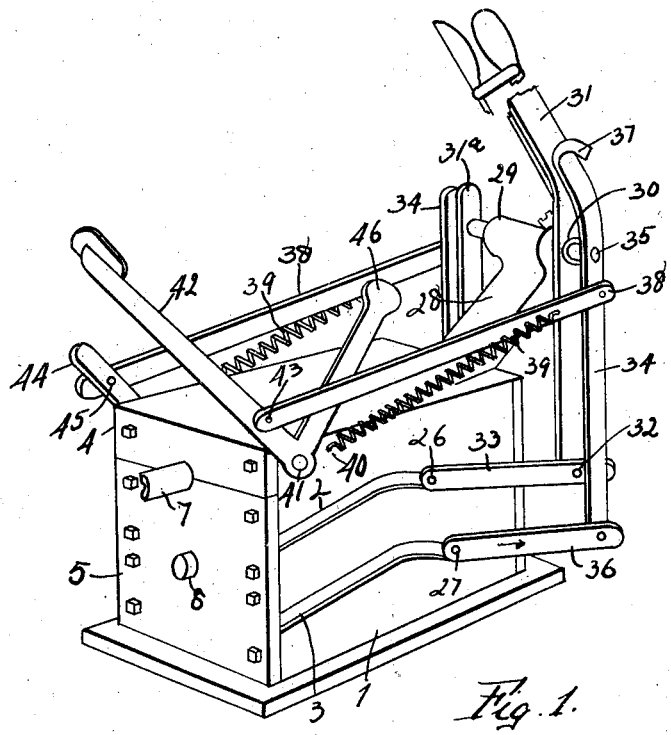
Figure 1, is a perspective view showing the hand and foot controlled levers of my device as applicable to automobiles.
Figure 2:
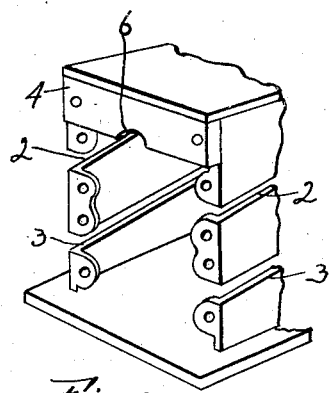
Fig. 2, is a perspective view of a portion of the casing, the front plate being removed which allows a ring mechanism to be pushed free of the casing, and a new ring substituted for a worn one without detaching any of the parts.
Figure 3:
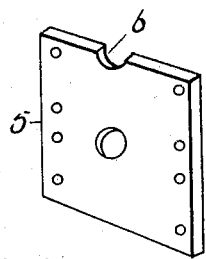
Fig. 3, is a perspective of the front plate removed.

In carrying out my invention as here embodied, 1 represents a box like casing in which and upon which are mounted the various operating parts of the device, this casing having the deflected guide slots 2 and 3 formed in each side thereof, the front end of said casing being closed by the removable face plates 4 and 5, and in the meeting edges of these plates is formed a bearing 6 for the front end of the drive shaft 7 half of said bearing being in each of the plates, and in the plate 5 is formed a bearing for the front end of the driven shaft 8, the rear ends of these shafts being journaled in suitable bearings 9 and 10 respectively.

Upon the drive shaft 7 is rigidly mounted the double cone 11, 11ª so as to revolve therewith and upon the driven shaft 8 is mounted the double cone 12, 12ª, the section 12ª of this last named cone being of smaller diameter than the section 12 thereof, these cones being tapered in the opposite direction from the driving cone.

13 represents an idle roll having its bearing spindles 14 and 15 fitted in the open bearing 16 and 17 so that it may contact and ride upon the section 12ª of the driven cone, and this idle roll is normally held out of contact with its cone by a suitable spring 18 here shown as a flat spring, but may be of any other suitable design.

19 represents the friction clutch ring which is here shown as composed of two side plates 20 having interposed therebetween alternate layers 21 of suitable material such as aluminum and fiber all being securely bound together by the rivets 22 or instead of rivets any other suitable means may be utilized for securing the sections of the ring together. In cross section the solid portion of this ring is elliptical or out of round as clearly shown for the purpose hereinafter set forth. The ring 19 just described is placed around the driven cones in such manner that it will run between the surfaces of the driving and driven cones and serve as the medium for transmitting power from the former to the latter.

23 and 24 represent two shoes or shifting members which are slotted as indicated at 25, and through these slots project portions of the ring so that when the shoes are moved the ring will be carried therewith. The shoe 23 has projecting from each end thereof the guide rods 26 which are fitted to slide in the deflected slots 2, said slots being of such contour as to cause the shoe, in moving back and forth within the casing 1 to travel upon the inclines corresponding to the angle of the adjacent faces of the drive and driven cone. The shoe 24 is likewise provided with guide rods 27 projecting from the ends thereof through the deflected slots 3 in like manner causing this shoe to travel upon lines corresponding to the lines upon which the shoe 23 travels when moved back and forth.

28 represents a bracket projecting from the casing 1 and having a suitable bearing 29 formed therewith, and in this bearing is journaled the hollow shaft 30 upon which is rigidly secured the hand lever 31, its lower portion extending downward below said shaft and having pivoted thereto at 32 the link 33, the opposite end of said link being pivoted to one of the guide rods 26 carried by the shifting shoe 23. To the opposite end of the hollow shaft 30 is secured the secondary operating lever 31ª having pivoted to its lower end a link corresponding to the link 33, the outer end of which is pivoted to one of the guide rods 26. By this arrangement the moving of the operating lever 31 will carry with it the secondary lever 31ª, and through the links 33 move the shoe back or forth corresponding to the movement of the lever 31, and this movement of the shoe will slide the ring 19 back and forth between the driving and driven surfaces of the cones, the range of the movement of said levers being such as to carry the ring from one end of the cone to the other. In order that the ring 19 may be freed from driving contact with the cones during the above described shifting movement of said ring I provide the levers 34 which are rigidly secured to the shaft 35 the latter projecting through and being journaled in the hollow shaft 30 and to the lower ends of these levers 34 are pivoted the links 36 which in turn are pivoted to the guide rods 27 carried by the shoe 24.

Figure 10:
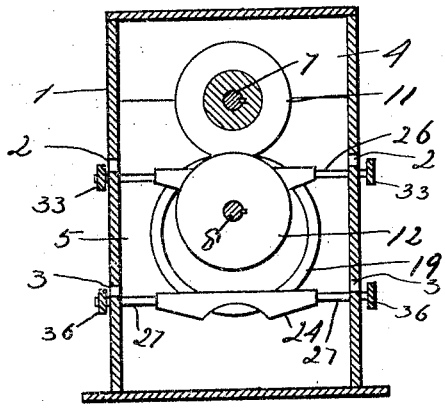
Fig. 10, is a cross section through the casing showing the driving and driven cones with the clutch ring in proper position therebetween.
Figure 11:
Fig. 11, is a central vertical section of the bearing in which is fitted the hollow shaft carrying the hand operating lever and showing the foot lever carried by the shaft which is journaled in the hollow shaft.

One of the levers 34 extends upward and terminates in the foot piece 37 so that when the ring is to be shifted between the cones the application of the operator's foot to this foot piece will draw the shoe 24 rearward or in the direction of the arrow marked upon the links 36 thereby tilting the ring sufficiently to cause it to swing out of driving contact with the surfaces of the cone as will be readily understood and as indicated in Fig. 10. This will permit the shifting of the ring to different positions between the cones and when the ring has been brought to the position desired the release of the foot lever will permit the lower portion of the ring to be drawn in a reversed direction from said arrow thereby bringing the ring to the position shown in Fig. 9, which will cause it to contact with the surfaces of the driving and driven cones sufficiently to transmit power from one to the other.

In order that the clutch ring 19 may be normally held in driving contact with the surfaces of the cones or in the position shown in Fig. 9, I pivot the links 38 to the levers 34 at a point below the shaft 35, and to these links are attached the long coil springs 39 their opposite ends being attached to the casing at 40 so that these springs will have a constant tendency to draw the levers 34 in the reversed direction from the arrow upon the link 36 thereby holding the shoe 24 in the proper relative position to the shoe 23 to maintain the ring in the position shown in Fig. 9.

41 represents a shaft which is journaled in the sides of the casing 1 and has secured thereon the foot lever 42 to which is pivoted the forward end of the link 38 at 43. This shaft 41 also has secured upon the opposite end thereof the lever 44 to which is pivoted the opposite link 38 at 45, and this arrangement provides for the manual actuation of the levers 34 in the same direction as the pull of the springs 39; so that when it is desired to increase the friction between the clutch ring and the surfaces of the cones sufficient pressure is utilized by the foot lever 42 to produce the desired result which action will bring the ring in substantially the position shown in Fig. 7 relative to the driving and driven surfaces of the cones. This will put it within the control of the operator to increase the power transmitting action of the device as will be readily understood.

To further facilitate the manipulation of the device, I provide a secondary or push off foot lever 46 which is formed with or secured to the foot lever 42 and extends at substantially right angles thereto so that by applying pressure to this secondary foot lever the levers 34 will be swung in the direction of the arrow upon the link 36 thereby tilting the clutch ring to the position shown in Fig. 10 or in the same manner as if power had been applied to the foot lever 37.

When it is desired to reverse the driven shaft, the shoes 23 and 24 are shifted as before described so as to draw the clutch ring between the sections 11ª and 12ª of the cones and as this takes place the clutch ring will over ride the idle roll 13 forcing it into contact with the driven cone against the action of the spring 10 and when the shoe 24 has been so manipulated as to force the ring into firm contact with the section 11ª of the driving cone and the idle roll 13 the motion of the driving cone will be transmitted in a reverse direction to the section 12ª of the driven cone thereby reversing the driven shaft 8; but as soon as the clutch ring has again moved from between the sections 11ª and 12ª the idle roll 13 will be sufficiently elevated by the action of the spring 10 to clear the surface of section 12ª, as throwing it out of action.

For convenience in gaining access to the mechanism contained within the casing 1, I have provided for the easy removal of the face plate 5. To prevent the lower cone from sagging when this plate is removed the bracket 47 is secured within the casing, its outer end carrying the bearing 48 on which is fitted the cap 49, said cap carrying the open bearing 17; thus when it is necessary to remove the clutch ring for repair or substitution the removal of the face plate 5 will give free access to said ring and the shoes carrying the same so that they may be uncoupled from their connections and withdrawn from the casing.

From the foregoing description it will be obvious that a great variety of speeds between the driving and driven shafts may be had without the wear and tear and jar attendant upon the use of change and reversing gear, while at the same time this mechanism provides for putting the driven cone into or out of action without the use of a clutch, thus making my improved mechanism especially desirable for automobile use. Another advantage when the device is used for automobile purposes is in the more nearly direct line 5 between the device and the differential of the back drive of the automobile.

I prefer to include the usual universal joint, but as the line of motor drive is higher than my transmission device I obtain a more nearly straight line device than is found in the present day automobile practice; thus reducing the wear upon the universal joint and tending to overcome the power loss incident to the greater angle of the drive shaft.

In my comparatively simple device I have less parts than are required where a separate clutch and gear transmission are used, since I eliminate gears which are liable to strip, and my friction device members do not require the use of lubricant except in the bearings and it is more silent than gear driven devices. The few and simple parts are comparatively less costly to manufacture than are the separate clutches and transmissions in general use.

While I have shown the cones made of metal they may be made of fiber or various face or fiber metal or the metal cones may be covered with leather or leather substitutes.

While my invention is highly advantageous for use in automobile practice it is likewise especially adapted for use in motor boats and other marine work as well as for all classes of machines requiring transmission of power at various speeds relative to the driving shaft and where it is necessary or desirable to frequently stop and start the machine.

Of course I do not wish to be limited to the exact details of construction as herein shown as these may be varied within the limits of the appended claims without departing from the spirit of my invention.

Having thus fully described my invention, what I claim as new and useful is:—

1. In a mechanical movement for combined clutch and transmission, a pair of cones set in opposite direction relative to each other, a ring the cross section of the solid portion of which is substantially elliptical, said ring being so interposed between the cones as to revolve therewith and transmit power from one cone to the other, said ring also being capable of being swung at various angles to increase the grip therebetween and the cones or free it from gripping contact therewith.

2. In a device of the character described, a bearing of double cones so set relative to each other that the tapers of said cones are in opposite directions from each other, an idle roll interposed between certain sections of said cones, a ring the cross section of whose solid portion is substantially elliptical, said ring being so interposed between the cones as to transmit power from one cone to the other by friction and arrest the transmission of said power by the tilting of the ring, and means for moving said ring lengthwise of the cones to vary the speed between the driving and driven cones and to reverse the motion of the driven cone.

3. In a device of the character described, a pair of double face cones so set relative to each other that the angles of their faces are in reversed directions, an idle roll interposed between certain sections of the cones, a ring the cross section of the solid portion thereof being substantially elliptical, two independently movable shoes housing portions of the ring, and means for so moving said shoes as to carry the ring lengthwise between said cones and tilt said ring to various angles.

4. In a device of the character described, a casing, a pair of double cones journaled in said casing, the inclines of said cones being disposed in opposite directions, an idle roll interposed between certain sections of the cones, a clutch ring the cross section of the solid portion thereof being substantially elliptical, two slotted shoes through which portions of the ring project, spindles carried by the shoes and projecting through guide slots formed in the sides of the casing, links pivoted to certain of said spindles, and operating levers to which said links are pivoted for manually moving the shoes to cause the clutch ring to travel lengthwise of the cones and to assume different angles thereto.

5. In a device of the character described, a casing, a pair of double cones journaled in said casing, the inclines of said cones being disposed in opposite directions, an idle roll interposed between certain sections of the cones, a clutch ring the cross section of the solid portion thereof being substantially elliptical, two slotted shoes through which portions of the ring project, spindles carried by the shoes and projecting through guide slots formed in the sides of the casing, links pivoted to certain of said spindles, operating levers to which said links are pivoted for manually moving the shoes to cause the clutch ring to travel lengthwise of the cones and to assume different angles thereto, and springs for holding one of said shoes in normal position relative to the other shoe.

6. In a device of the character described, a casing having guide slots formed in the sides thereof, a double face drive cone journaled in said casing, a double face driven cone also journaled in the casing, an idle roll interposed between certain sections of the cones, a ring the cross section of whose solid portion is out of round, a slotted shoe through which the upper portion or the ring projects, spindles carried by said shoe, said spindles projecting through certain of the guide slots in the sides of the casing, links pivoted to certain of said spindles, a hand operating lever to which the links are pivoted so that when said hand lever is moved the shoe will be moved back and forth to carry the ring to different positions between the faces of the cones, a hollow shaft to which the hand lever is secured, a bracket in which the hollow shaft is journaled, a second shaft journaled in the hollow shaft, levers secured to the second shaft, links pivoted to the last named levers, a second slotted shoe through which the lower portion of the ring projects, spindles carried by the last named shoe, said spindles projecting through certain of the guide slots in the sides of the casing, links pivoted to certain of the spindles of the last named shoe, said links also being pivoted to the last named levers for moving the shoe by the operation of said last named levers, springs for drawing the last named levers in one direction.

7. In a device of the character described, a casing having guide slots formed in the sides thereof, a double face drive cone journaled in said casing, a double face driven cone also journaled in the casing, an idle roll interposed between certain sections of the cones, a ring the cross section of whose solid portion is out of round, a slotted shoe through which the upper portion of the ring projects, spindles carried by said shoe, said spindles projecting through certain of the guide slots in the sides of the casing, links pivoted to certain of said spindles, a hand operating lever to which the links are pivoted so that when said hand lever is moved the shoe will be moved back and forth to carry the ring to different positions between the faces of the cones, a hollow shaft to which the hand lever is secured, a bracket in which the hollow shaft is journaled, a second shaft journaled in the hollow shaft, levers secured to the second shaft, links pivoted to the last named levers, a second slotted shoe through which the lower portion of the ring projects, spindles carried by the last named shoe, said spindles projecting through certain of the guides in the sides of the casing, links pivoted to certain of the spindles of the last named shoe, said links also being pivoted to the last named levers for moving the shoe by the operation of said last named levers, springs for drawing the last named levers in one direction, and a foot lever connected with the last named levers for manually moving the last named shoe against the action of said spring.

8. In a device of the character described, a casing having guide slots formed in the sides thereof, two double face plates removably secured to one end of the casing, each of said plates carrying one half of a shaft bearing at their meeting edges, a drive shaft journaled in said bearing, a driven shaft journaled in one of the face plates, a double face driven cone secured upon the driven shaft, means for transmitting power at varying speeds from the drive cone to the driven cone, and means for shutting off the transmission of power from the drive cone to the driven cone.

9. In combination with a drive cone, and driven cone, a clutch ring adapted to transmit power from the drive cone to the driven cone at varying speeds and be thrown out of operative position.

In testimony whereof I have hereunto affixed my signature.

AUGUSTUS ALBERT WEST.